April 24, 1956     K. J. WISE     2,742,891

DRESSER FOR ABRASIVE WHEELS

Filed Jan. 5, 1954

INVENTOR
KENNETH J. WISE

BY

ATTORNEYS

United States Patent Office 2,742,891
Patented Apr. 24, 1956

2,742,891

DRESSER FOR ABRASIVE WHEELS

Kenneth J. Wise, Kenmore, N. Y.

Application January 5, 1954, Serial No. 402,297

3 Claims. (Cl. 125—37)

This invention relates to wheel dressers of the type used for truing the surfaces of emery and other grinding wheels.

A feature of the invention is the provision of a cutter disk for such a dresser which can be assembled in spaced relation to other cutter disks without employment of spacing washers.

Another feature is the provision of a cutter disk and shaft assembly for such a dresser in which the disk may be formed by simple blanking and die operations, and hardened, and is then ready for assembly upon the shaft without difficulty and with assurance of maintaining its proper position on the shaft and relative to other cutter disks.

A further feature is the provision of an assembly by which the cutter disks may be engaged tightly and accurately with the shaft portion.

With these and other features as objects in view, an illustrative form of construction is shown on the accompanying drawing, in which.

Figure 1:
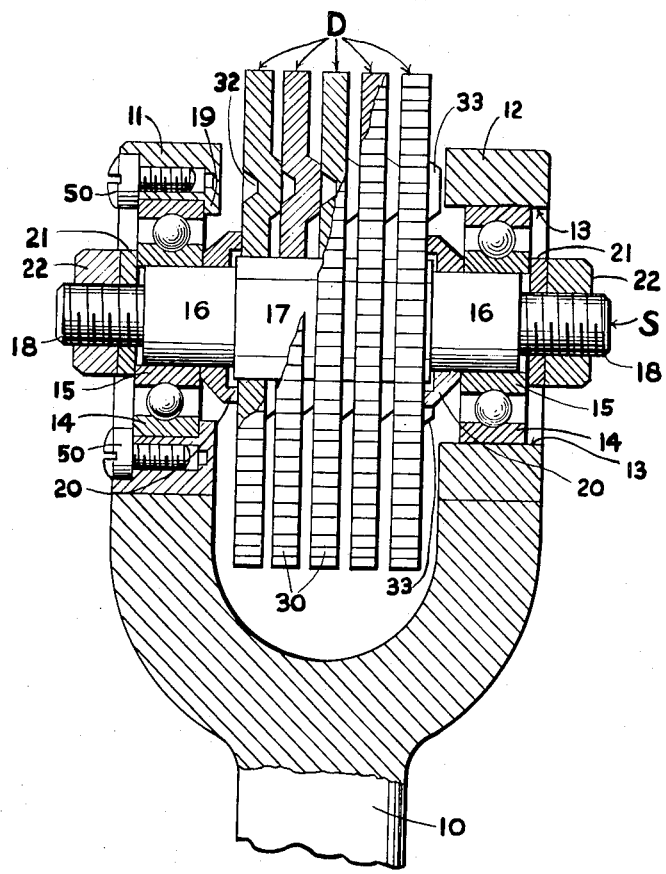
Fig. 1 is an axial section through the head of a wheel dresser embodying the invention, with parts of the cutter disks in section and other parts in elevation.

In the drawing, the dresser housing or body 10 has a bifurcated portion including the parts 11, 12: such heads or bodies are well-known and are employed by rigid clamping to a traversing structure whereby accurate presentation to the abrasive wheel may be accomplished, or by use of an extension handle they may be used for roughly opening up the abrasive wheel for free cutting. The parts 11, 12 are formed with alined apertures 13, in which are fitted the outer races 14 of antifriction bearings having the inner races 15 with close sliding fit upon the reduced portions 16 of a shaft S which has a non-round, for example polygonal, preferably regular hexagonal, central portion 17 and the reduced and threaded ends 18. Thus the shaft is journalled in the alined handle bifurcations. The part 12 has an internal flange 19 against which bears the corresponding outer race 14: and screws 50 are employed to hold this race, and therewith the dresser disk assembly, in position.

Upon the hexagonal portion 17 is mounted a nest of cutter disks D, described individually hereinafter, with the over-all length of the nest preferably slightly less than the length of the hexagonal portion 17. Dished pressure washers 20 fit around the reduced portions 16 and engage the outermost surfaces of the nest. Washers 21 fit around the threaded shaft ends 18 and bear against the inner races 15. Nuts 22 engage the threaded ends and serve to clamp the parts tightly together, by pressure through the washers 21, the inner races 15, the dished washers 20, and between the cutter disks in the nest.

Figure 2:
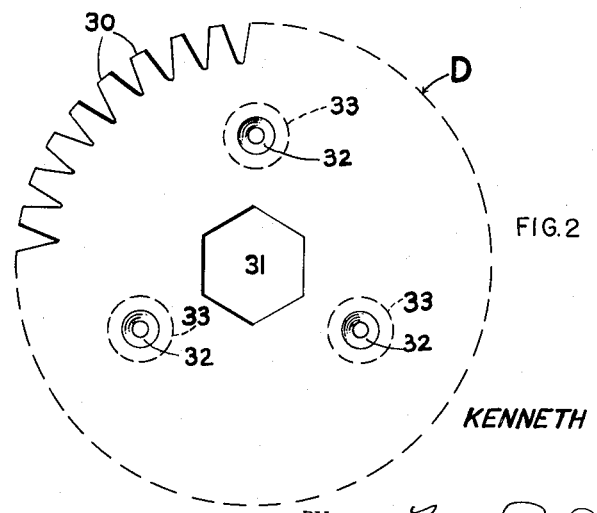
Fig. 2 is a face view of a cutter disk.

Each cutter disk D, Fig. 2, can be formed by blanking from a sheet of steel of appropriate carbon content, therewith forming the peripheral cutter teeth 30. The polygonal, preferably hexagonal, central hole 31, closely fitting the shaft portion 17, may be formed in the same or a separate die operation. Likewise, punch-and-die operations are performed, whereby depressions 32 are formed at one surface of the disk, with displacement of the disk material beyond the other face to provide elevations 33 of greater area than the depressions 32, and preferably having flat tops.

Three such displacements of material are preferably used, as shown in Fig. 2, equally spaced along a concentric circle, whereby the elevations 33 provide alining supports between the successive disks of the nest, as shown in Fig. 1. With a regular polygonal shaft and hole (for example of hexagonal, square or diamond form), and three elevations, the possible relative positions of the disks may bring an elevation 33 opposite a depression 32 or opposite a flat part of the surface of the adjacent disk. In either case, the alinement and spacing is attained, as the elevations have flat tops larger than the depressions 32. Hence in assembly it is merely necessary to arrange the disks in a group with elevations appearing between disks, place the nest between the handle parts 11, 12, and introduce a shaft end through one of the apertures and thread it through the disks by turning it while sliding axially. One end set of dished washer, antifriction bearing, washer and nut may be assembled before threading, and thereafter fitted into the corresponding part 11 or 12: the other end set is then introduced and drawn tight, and the screws 50 introduced to complete the device.

It will be noted that in the illustrated form, the engaging surfaces of the washers 20 are of smaller diameter than the annular area in which the projections 33 are located; so that tightening of the nuts 22 can cause a springing of the disks to effect a positive engagement and binding action at the inner edges of their central holes upon the surface of the shaft portion 17. This springing can be very small with the central holes 31 and the shaft portion 17 being related by a sliding fit.

It is obvious that the illustrated form is not restrictive, and that the invention may be practiced in many ways within the scope of the appended claims.

I claim:

1. In a dresser for abrasive wheels having a body and a rotatable shaft extending through an aperture in the body, the combination of a nest of cutter disks each having a central hole at the disk axis and a plurality of elevations at one surface opposite depressions in the other surface, said elevations being spaced from the central hole and from one another about the disk axis, each disk having flat parts between the depressions on said other surface, the disks being spaced apart and alined relative to one another by said elevations, the area of each depression being less than the area of each elevation, said nest being located on said shaft with the shaft extending through the central holes whereby the elevations provide alining and spacing supports between adjacent disks regardless of whether an elevation on one disk is opposite a depression or a flat part of the surface of the adjacent disk, and means for holding the nest of disks against movement relative to the shaft.

2. A dresser for abrasive wheels, having a body with an aperture and an internal flange at said aperture, an antifriction bearing in said aperture and having outer and inner races with the said outer race engaged with the said flange, means for holding the said outer race against the said flange, a rotatable shaft having at one end a reduced end portion extending through the said inner race, means on said shaft at said one end engaged with the other surface of said inner race, the other end of said shaft being threaded, a nest of cutter disks having central holes and each having projections on the individual disks spaced from the shaft and arcuately spaced from one another and effective for holding the disks spaced axially apart, the central part of said shaft and said disks having mating portions so they are compelled to turn together, means on the said other end of the shaft for holding the disks against relative axial movement, a dished pressure washer located around the reduced end portion of the shaft and engaged with the said inner race and with the disk which is adjacent the said bearing at points on said disk of smaller diameter than the annular area occupied by the said projections thereof, and a nut on the threaded end of the shaft and effective to act through the said disk holding means to press the disks against said pressure washer and cause engagement of said disks and projections.

3. A dresser for abrasive wheels, having a bifurcated body and a rotatable shaft journalled in alined apertures in the handle bifurcations, the combination of a nest of cutter disks each having a polygonal central aperture and integral projections on the the disks effective for holding the disks spaced axially apart, each said projection being opposite a depression at the opposite surface of the respective disk, said projections being spaced from the central aperture and arcuately spaced from one another and located within an annular area on the respective disk, said shaft having a central part of polygonal section closely fitting said polygonal central disk apertures, and clamping means connected to the shaft and engaged with the end disks at surfaces on the clamping means of smaller diameter than said annular areas of said end disks.

References Cited in the file of this patent

UNITED STATES PATENTS

| | | |
|---|---|---|
| 817,528 | Sherman | Apr. 10, 1906 |
| 930,535 | Curtin | Aug. 10, 1909 |
| 1,220,175 | Brisben | Mar. 27, 1917 |
| 1,468,395 | Place | Sept. 18, 1923 |
| 1,805,514 | De Mattia | May 19, 1931 |
| 1,852,639 | Bartlett | Apr. 5, 1932 |
| 2,202,843 | Edwards | June 4, 1940 |